(12) United States Patent
Aoki

(10) Patent No.: US 9,158,488 B2
(45) Date of Patent: Oct. 13, 2015

(54) DATA PROCESSING APPARATUS AND DATA PROCESSING METHOD FOR GENERATING DATA TO BE EDITED USING A PRINT DRIVER

(75) Inventor: Nobushige Aoki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/599,782

(22) Filed: Aug. 30, 2012

(65) Prior Publication Data

US 2013/0057891 A1 Mar. 7, 2013

(30) Foreign Application Priority Data

Sep. 7, 2011 (JP) ................... 2011-194963

(51) Int. Cl.
*G06F 3/12* (2006.01)
*H04N 1/387* (2006.01)
*G06F 17/21* (2006.01)

(52) U.S. Cl.
CPC ............ *G06F 3/1245* (2013.01); *G06F 3/1208* (2013.01); *G06F 3/1288* (2013.01); *G06F 17/211* (2013.01); *H04N 1/387* (2013.01); *G06F 3/1246* (2013.01)

(58) Field of Classification Search
None
See application file for complete search history.

(56) References Cited

U.S. PATENT DOCUMENTS

| 7,161,691 | B2 * | 1/2007 | Nakagiri et al. | 358/1.13 |
| 7,233,411 | B2 * | 6/2007 | Kuroda | 358/1.18 |
| 2001/0024291 | A1 * | 9/2001 | Mori et al. | 358/1.12 |
| 2002/0051205 | A1 * | 5/2002 | Teranishi et al. | 358/1.18 |
| 2006/0250630 | A1 * | 11/2006 | Mori | 358/1.13 |
| 2011/0080614 | A1 * | 4/2011 | Sasaki | 358/1.18 |

FOREIGN PATENT DOCUMENTS

| JP | 2000-187566 A | | 7/2000 |
| JP | 2004-005245 A | | 1/2004 |
| JP | 2007-133756 A | | 5/2007 |
| JP | 2010-157208 A | | 7/2010 |
| JP | 2011-013866 | * | 1/2011 |
| JP | 2011-013866 A | | 1/2011 |
| JP | 2011-076227 A | | 4/2011 |

* cited by examiner

*Primary Examiner* — Jeremiah Bryar
(74) *Attorney, Agent, or Firm* — Canon U.S.A., Inc., IP Division

(57) ABSTRACT

A data processing apparatus includes an input unit configured to input data, a first processing unit configured to generate intermediate data using a printer driver based on the data input by the input unit according to a print setting that is determined not to divide an editing area of the data into pages, and a second processing unit configured to perform editing processing based on the intermediate data generated by the first processing unit.

32 Claims, 12 Drawing Sheets

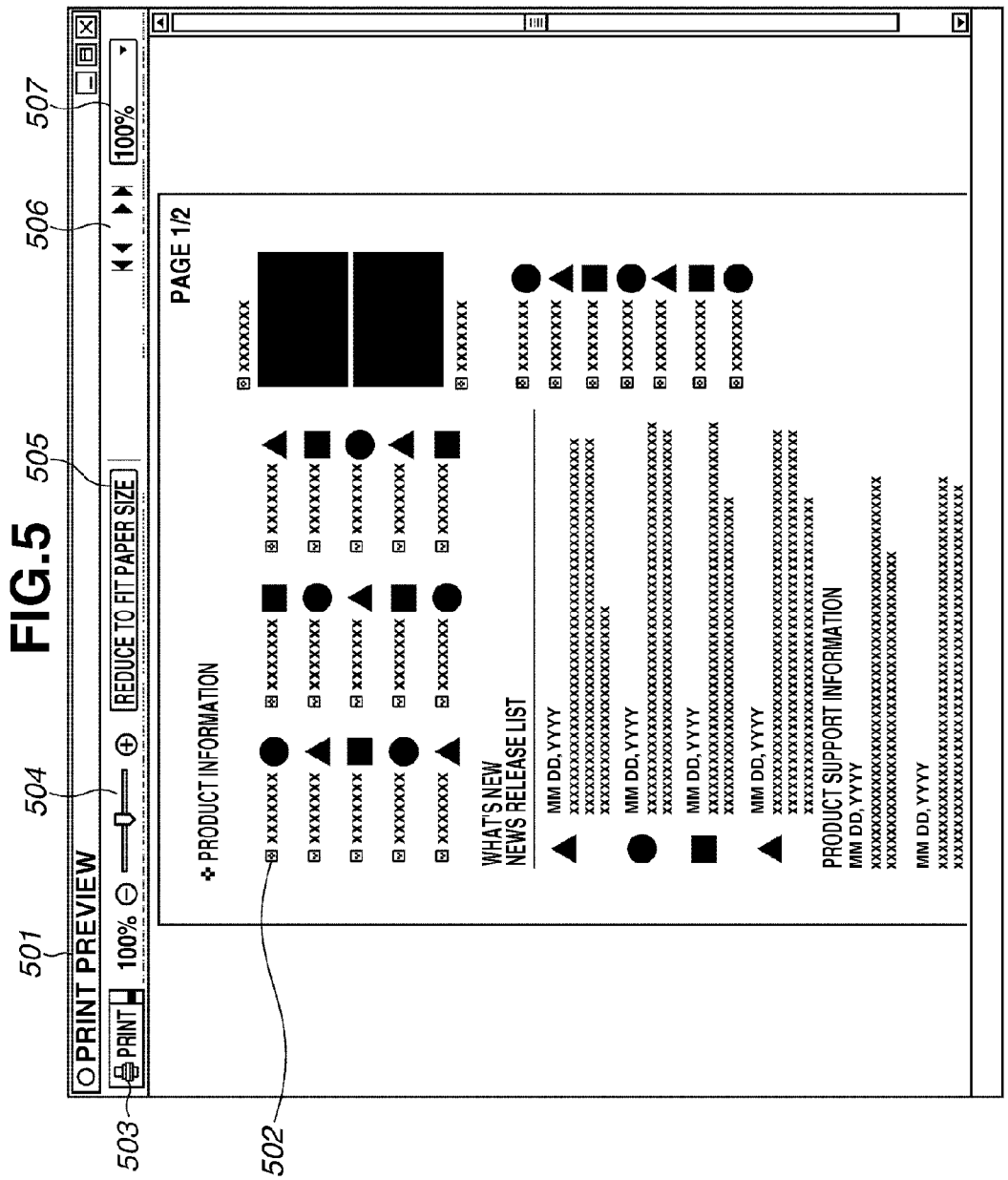

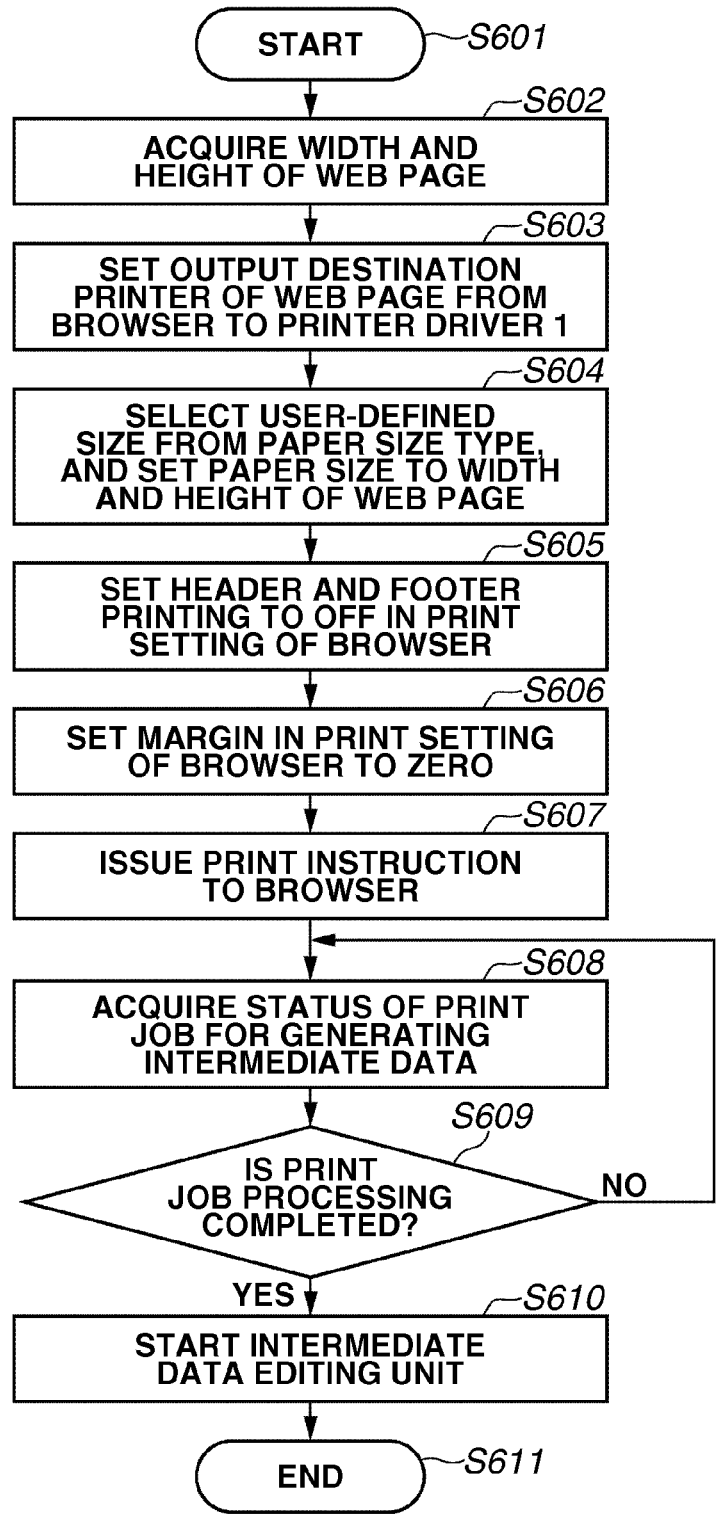

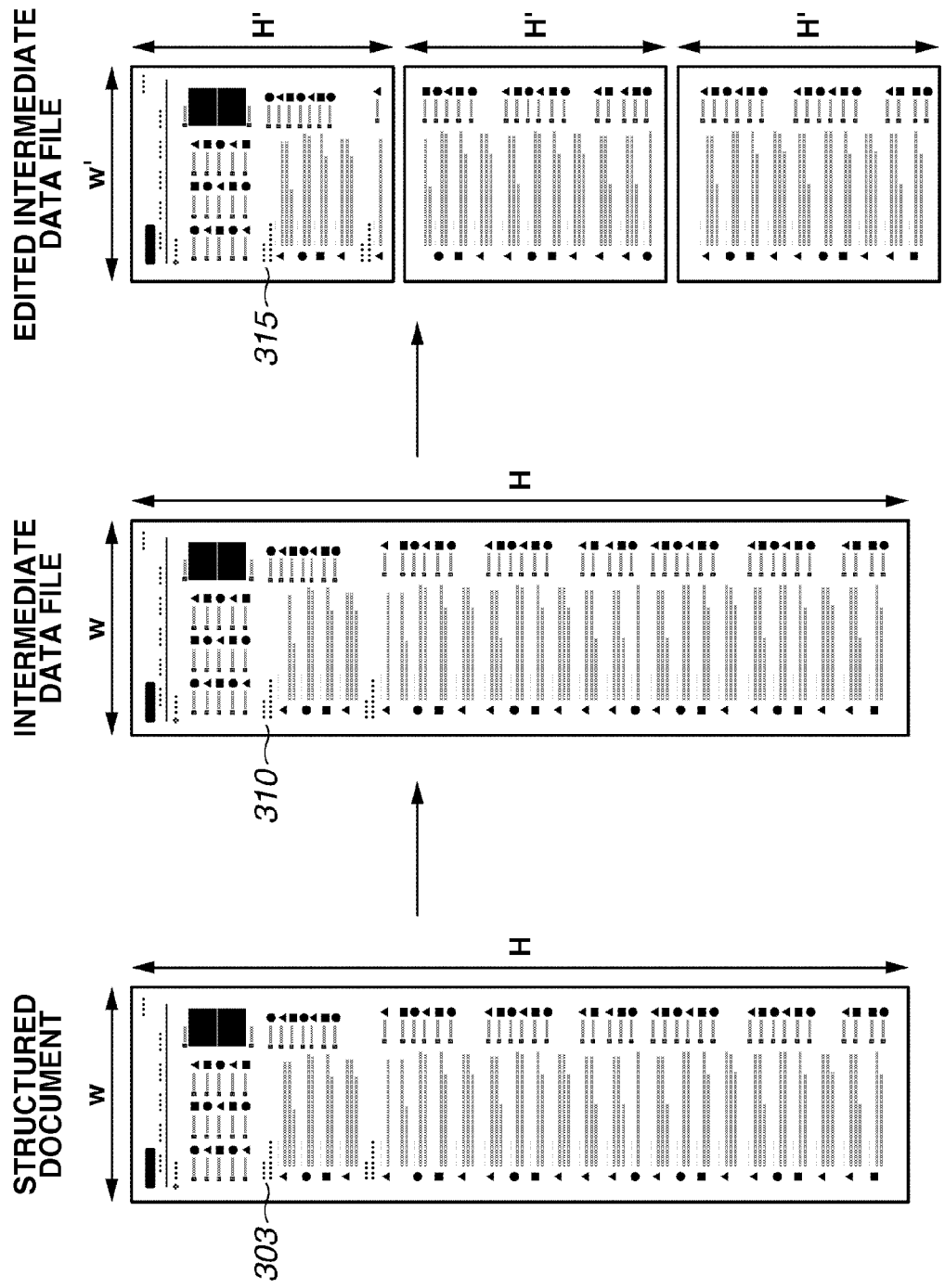

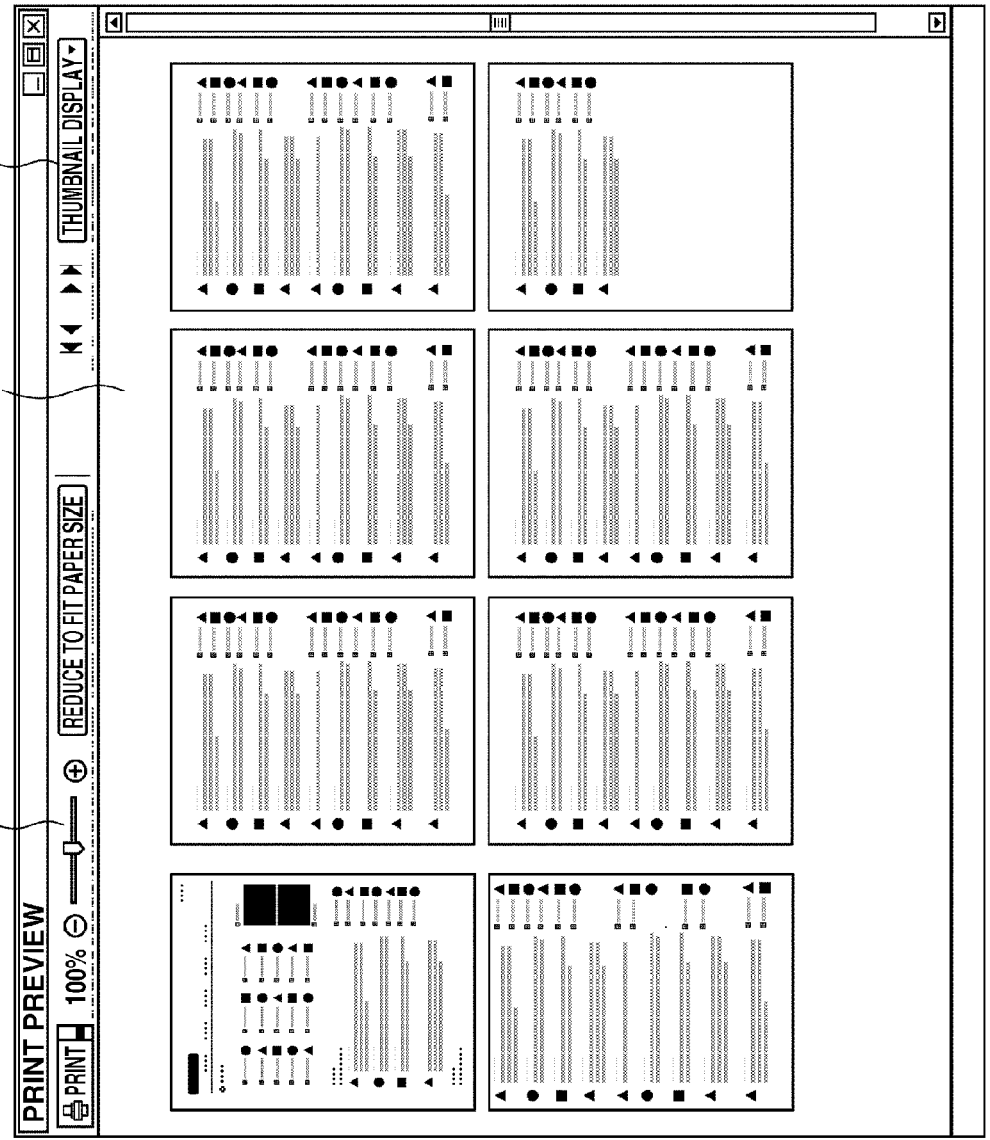

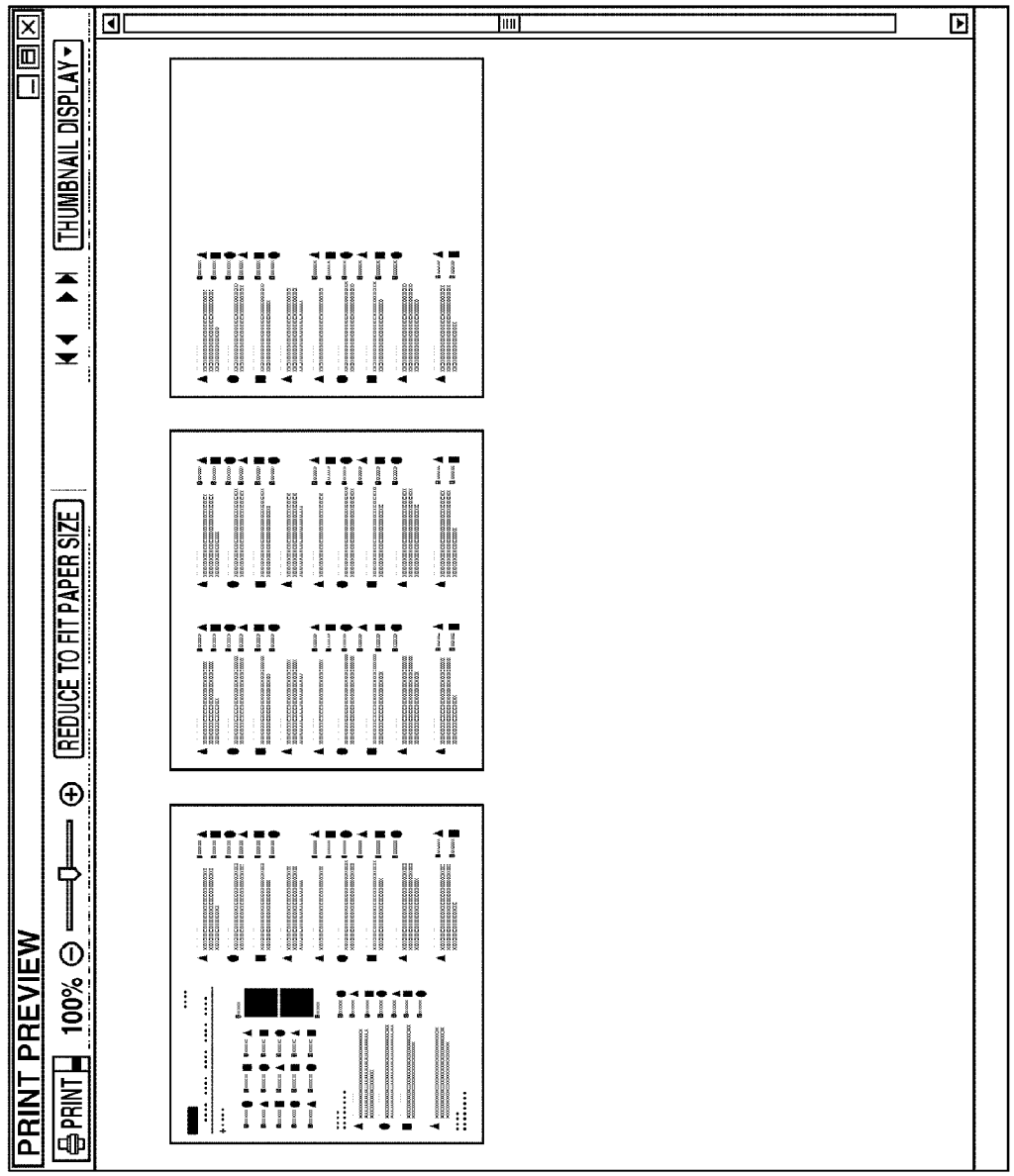

DATA PROCESSING APPARATUS AND DATA PROCESSING METHOD FOR GENERATING DATA TO BE EDITED USING A PRINT DRIVER

BACKGROUND OF THE INVENTION

1. Field of the Invention

Aspects of the present invention relate to a data processing apparatus that processes data to be edited, a data processing method, and a storage medium.

2. Description of the Related Art

Various types of information have been generally acquired by accessing a web page on the Internet. The web page includes a structured document described in a structured language, e.g., a Hyper Text Markup Language (HTML) or an Extensible Hyper Text Markup Language (XHTML). The web page can be displayed on a display by software referred to as a web browser, and can be printed out by a printer.

When the web page, which has been acquired using the web browser, is output after being edited, the image quality of an object such as characters and graphics is less degraded if the object is acquired in a vector format. Thus, the image quality of the edited web page will increase.

Japanese Patent Application Laid-Open No. 2000-187566 discusses generating editable data using a virtual printer driver and editing the generated data. The editable data is generated using the virtual printer driver so that the data can be edited in a vector format using a printer driver that is capable of outputting an object having a vector format still in the vector format.

When data having no information about a page such as a web page is converted into data having a format that can be printed by a printer driver, the printer driver generates a printing data while dividing the data into pages according to a recording medium size used for printing. At this time, some printer drivers provide a margin in an outer edge of each of the generated pages. Therefore, if there is an object existing across the pages when the data generated by the printer driver is edited, a margin may be inserted into the object. If the object is moved, for example, not to exist across the pages when the data generated by the printer driver is edited, the margin provided by the printer driver needs to be deleted. This can result in an increase in a processing load or degradation in image quality. In addition, some printer drivers move the object to the subsequent page if there is an object existing across the pages as described above. In this case, the data changes in layout from the original data so that an editing result according to the original layout cannot be obtained.

SUMMARY OF THE INVENTION

An aspect of the present invention is directed to a data processing apparatus capable of generating data editable when the data to be edited is generated using a printer driver.

According to an aspect of the present invention, a data processing apparatus includes an input unit configured to input data, a first processing unit configured to generate intermediate data using a printer driver based on the data input by the input unit according to a print setting that is determined not to divide an editing area of the data into pages, and a second processing unit configured to perform editing processing based on the intermediate data generated by the first processing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a screen by a structured module of the PC.

FIG. 6 is a flowchart illustrating the flow of processing according to the exemplary embodiment.

FIG. 7 illustrates the flow of processing including the acquisition of a structured document, the conversion into an intermediate data file, and the editing of the intermediate data file in this order.

FIGS. 8A, 8B, 8C, 8D, and 8E illustrate examples of a print preview.

DESCRIPTION OF THE EMBODIMENTS

Various exemplary embodiments, features, and aspects of the invention will be described in detail below with reference to the drawings.

Figure 1:
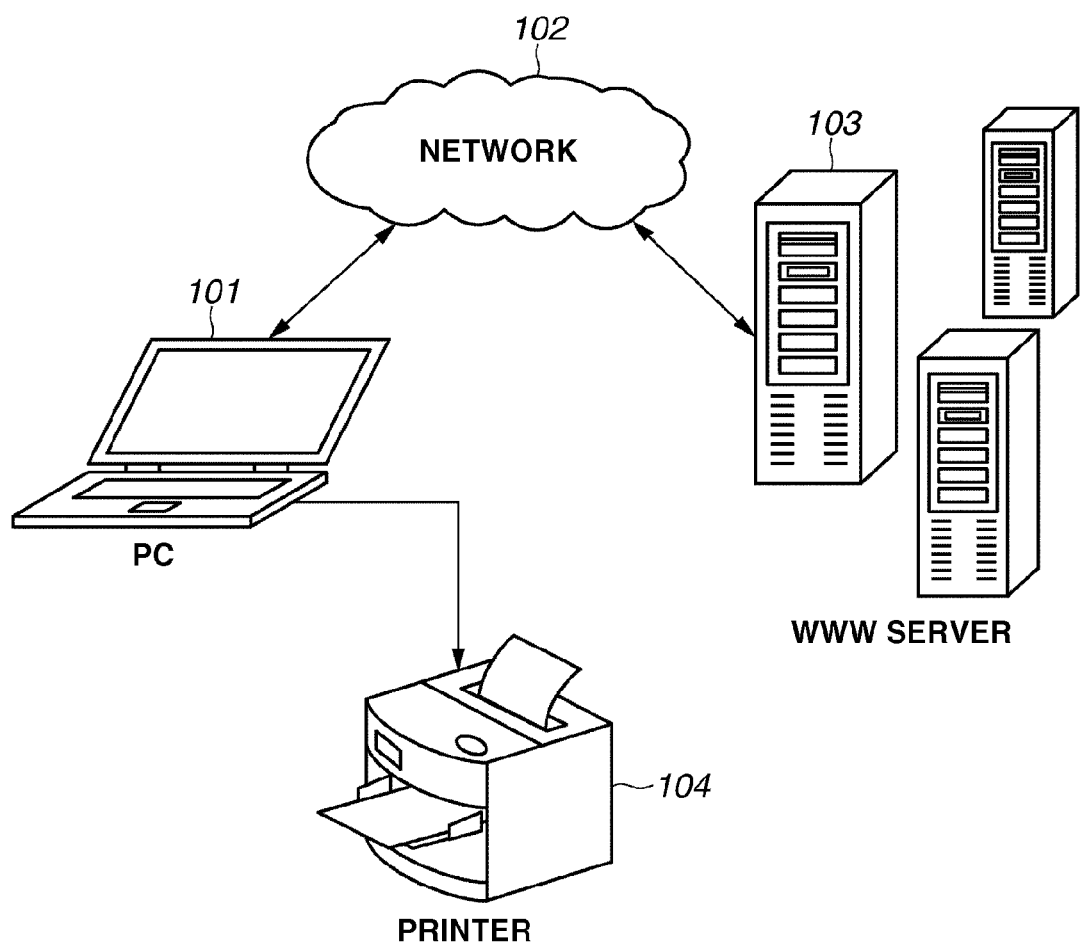
FIG. 1 illustrates a configuration of a system including a data processing apparatus according to an exemplary embodiment.

FIG. 1 is a block diagram illustrating a configuration of a system including a data processing apparatus according to an exemplary embodiment. A personal computer (PC) 101 serving as the data processing apparatus can download a web page from a plurality of world wide web (WWW) servers 103 onto the PC 101 via a network 102 and display the downloaded web page. The web page includes a structured document described in a structured language such as an HTML or an XHTML. The PC 101 is also connected to a printer 104, and can download the web page on the WWW server 103 onto the PC 101 and print out the downloaded web page onto sheets in the printer 104. The printer 104 reads the print data sent from the PC 101, and applies a recording agent such as ink onto the sheets based on the print data, to print a visible image.

Figure 2:
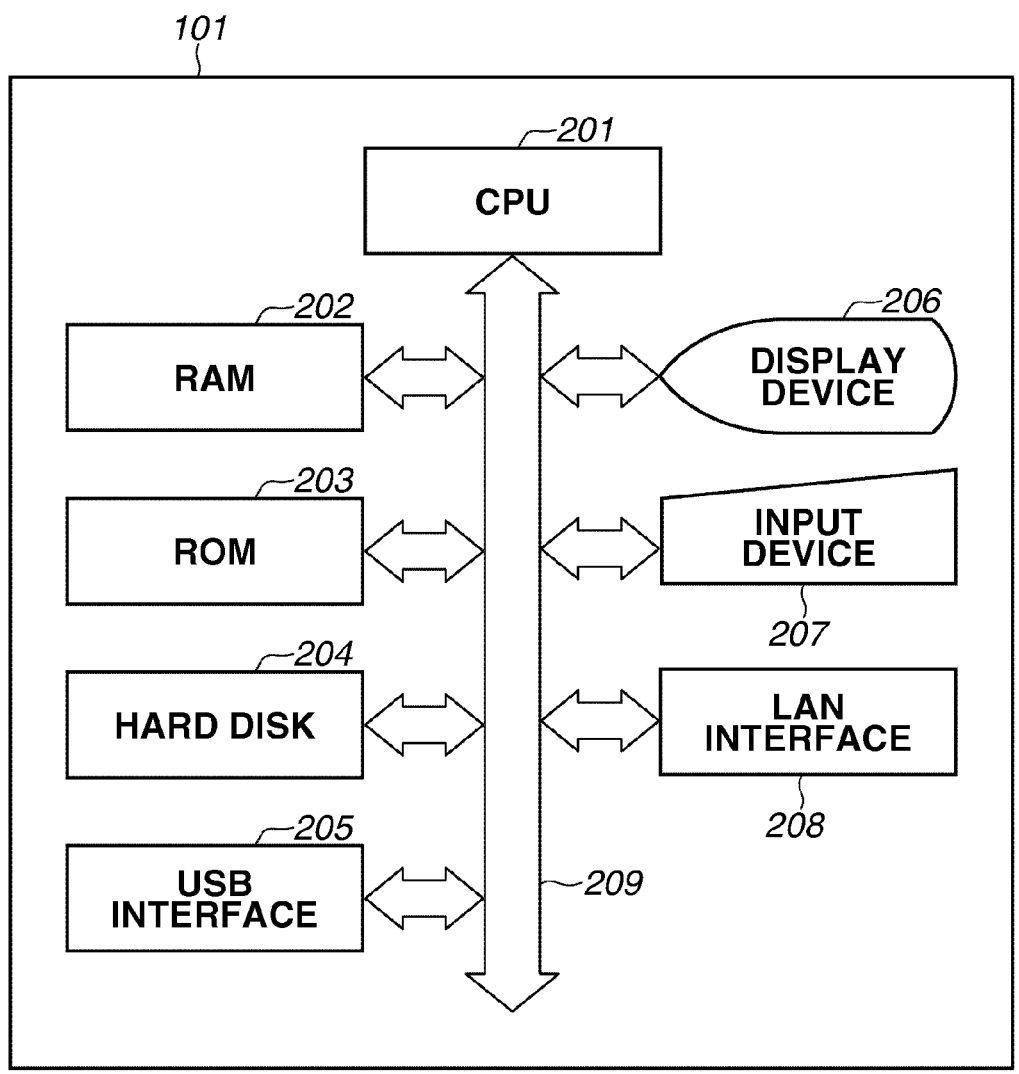
FIG. 2 is a block diagram illustrating a configuration of a personal computer (PC) serving as an example of the data processing apparatus.

FIG. 2 is a block diagram illustrating an internal configuration of the PC 101. A central processing unit (CPU) 201 processes data and an instruction according to a program stored in a random access memory (RAM) 202, a read-only memory (ROM) 203, or a hard disk 204. The RAM 202 is used as a temporary storage area when the CPU 201 performs various types of processing. The hard disk 204 stores an operating system (OS), a web browser (hereinafter referred to as a browser), and other software applications. A universal serial bus (USB) interface 205 is an interface, to which an USB cable is connected, for performing a data communication with the printer 104. The communication with the printer 104 may also be performed by a small computer system interface (SCSI), a network cable, or wireless.

A display device 206 displays the web page downloaded from the WWW server 103, a print preview image, or a graphical user interface (GUI) as a visible image based on control by the CPU 201. An input device 207 is a device for a user to issue various instructions to the PC 101, e.g., a pointing device or a keyboard. A system bus 209 connects the CPU 201, the RAM 202, the ROM 203, and the hard disk 204, and data is communicated on the system bus 209. A local area network (LAN) interface 208 is an interface for connecting the PC 101 to a LAN. Via the LAN interface 208A, a data communication is performed with the external WWW server 103, which is connected via a router (not illustrated) or the network 102. An interface supporting a wireless communication may be provided on the PC 101, to perform the data communication wirelessly. The display device 206 and the input device 207 may be integral with or separate from the PC 101.

Figure 3:
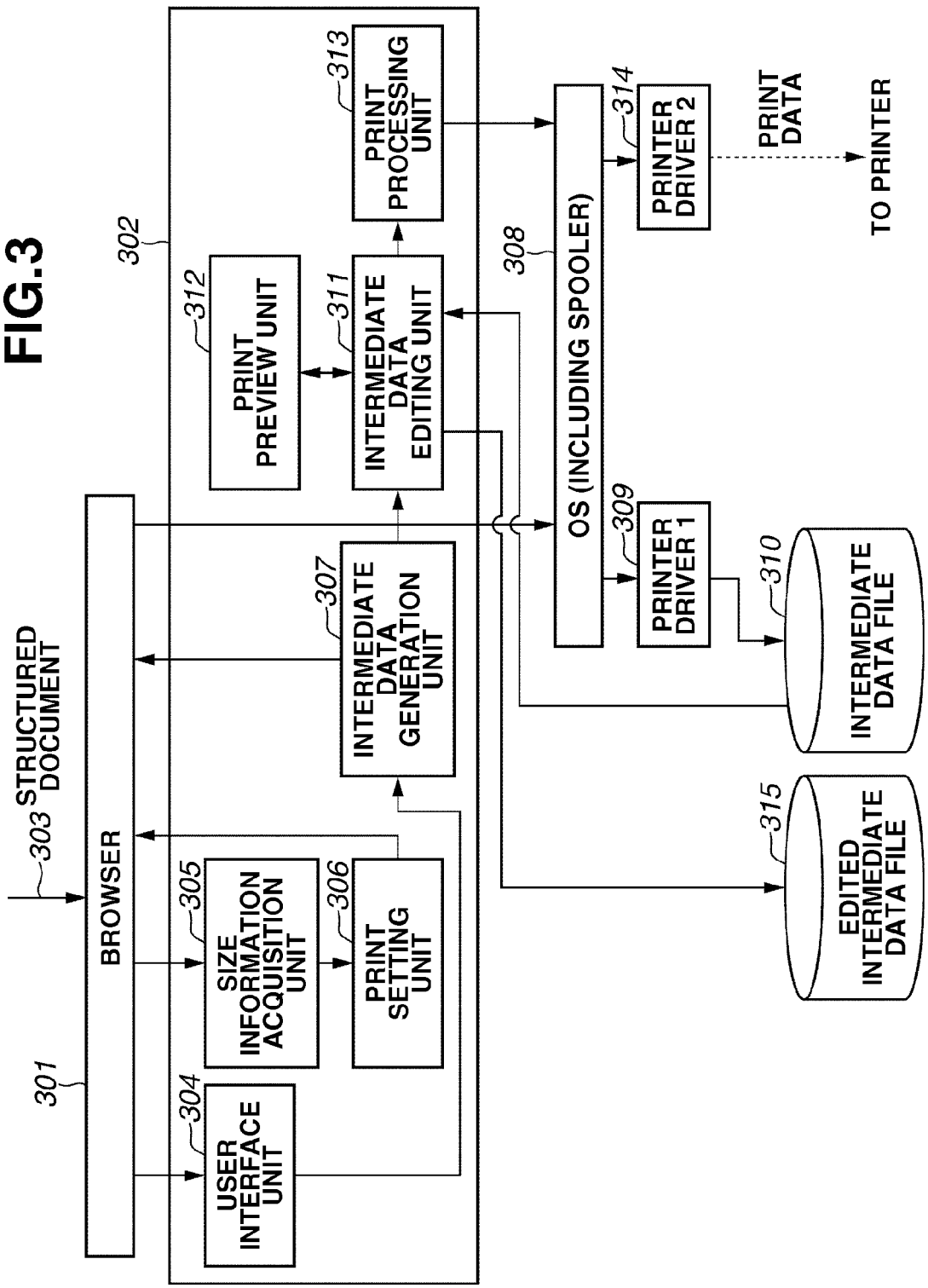
FIG. 3 is a block diagram illustrating a configuration of software installed on the PC.

FIG. 3 is a block diagram illustrating a configuration of software to be installed on the PC 101. A browser 301 is an application for displaying a web page (a structured document 303), and downloads the web page to the hard disk 204 on the PC 101 from the WWW server 103 and displays the downloaded web page on the display device 206. The structured document 303 is structured document data that is described in a structured language such as HTML or XHTML. In the structured document 303, elements such as a text and an image, which constitute the structured document 303, are described by tags. A separate file referred to as Cascading Style Sheet (CSS) for specifying display styles of the elements is specified within the structured document 303. The browser 301 analyzes the input structured document 303 and displays the structured document 303 on the display device 206 according to the format specified by the tags. The browser 301 may include a general-purpose browser which can visualize at least a structured document and in which plug-in software, described below, can be incorporated.

A structured document printing module 302 is plug-in software to be incorporated in the browser 301, and is called by the browser 301. When the browser 301 is started, the browser 301 executes the structured document printing module 302. Each of processing units included in the structured document printing module 302 may be modularized as a sub-module, or may be a processing unit within one module. Formats of the structured document 303 may include various types.

In the structured document printing module 302, a user interface (UI) unit 304 is started by executing the structured document printing module 302. In a window of the browser 301, a print button 404 illustrated in FIG. 4 for the user to issue an instruction to start printing and a print preview button 405 illustrated in FIG. 4 for issuing an instruction to display a print preview.

An intermediate data generation unit 307 is executed when the user operates the print button 404 or the print preview button 405 that is displayed by the UI unit 304. The intermediate data generation unit 307 sets, by the above-mentioned operation, a printer driver 1 (309) as a printer driver for an output destination printer of the structured document 303 acquired by the browser 301, irrespective of a default printer set in an operating system (OS) 308. The printer driver 1 (309) is a virtual printer driver for generating an intermediate data file 310, in which a selectable user-defined recording medium size can be selected as a recording medium size. The printer driver 1 (309) may include a general-purpose virtual printer driver capable of generating image data in a page unit according to a predetermined recording medium size.

When the above-mentioned operation is performed, the intermediate data generation unit 307 acquires size information including the width and the height of the structured document 303, which is acquired and displayed by the browser 301, from a size information acquisition unit 305. The size information acquisition unit 305 analyzes the structured document 303, and determines (acquires) the size information. The unit of the size information to be determined is a pixel and a length (millimeter or inch). The intermediate data generation unit 307 sets the user-defined recording medium size using a print setting unit 306 as a recording medium size of the structured document 303 from the browser 301, at the time of print processing using the printer driver 1 (309), while setting the size information acquired as described above. The intermediate data generation unit 307 determines the recording medium size to prevent an editing target area of the web page (an editing area where an object to be printed exists) from being divided into a plurality of pages (a plurality of sheets) as much as possible.

The intermediate data generation unit 307 can issue a print instruction to the browser 301, and cause the browser 301 to perform print processing (generate rendering data for printing) based on the structured document 303. The browser 301 performs rendering processing for the printer driver 1 (309) via the OS 308 when the print instruction is issued, and outputs the rendering data on the printer driver 1 (309). The rendering data remains in a vector format if the structured document 303 includes data having a vector format such as characters and graphics. The printer driver 1 (309), which has received the rendering data, generates the intermediate data file 310 serving as spool data based on the rendering data, and stores the generated intermediate data file 310 in a predetermined storage area in the RAM 202. The intermediate data generation unit 307 does not generate intermediate data by itself but instructs the printer driver 1 (309) to execute a print job and generate an intermediate data file. The printer driver 1 (309) does not output the intermediate data file 310 on an actual printer after generating the intermediate data file 310 because the printer driver 1 (309) is a virtual printer driver. However, the browser 301 outputs the rendering data in a similar manner as if an actual printer driver actually performs an output on the actual printer.

The intermediate data file 310 has a similar format to that of the intermediate data file generated in an actual output on the printer 104, and the information such as characters and graphics remains in a vector format. The information may be converted into an image format, e.g., a bit map data format. The intermediate data file 310 may include an Enhanced Metafile Format (EMF), an XML Paper Specification (XPS), and a Portable Document Format (PDF).

The intermediate data generation unit 307 issues the print instruction to the browser 301, then monitors a status of a spooler in the OS 308, and determines whether the printer driver 1 (309) has converted the rendering data generated by the browser 301 into the intermediate data file 310. Thus, the intermediate data generation unit 307 detects that print job processing by the printer driver 1 (309) is completed, and starts an intermediate data editing unit 311 for editing the intermediate data file 310 in response to the detection. The intermediate data file 310 is output as editing data to the intermediate data editing unit 311 so that editing processing is performed.

The intermediate data editing unit 311 acquires the intermediate data file 310 generated by the printer driver 1 (309), which has been extracted by the intermediate data generation unit 307, and performs layout editing so that the acquired intermediate data file 310 appropriately fits sheets in actual printing according to a print setting. The intermediate data editing unit 311 performs layout editing of each object in the intermediate data file 310, determines and store the information about each object's arrangement, while generating an edited intermediate data file 315. To perform editing, the intermediate data editing unit 311 acquires print setting information including a recording medium size, a resolution, and a printable area, from a printer driver 2 (314) via the OS 308. The printer driver 2 (314) is an actual printer driver for a printer used when an edited web page is actually printed. The printer driver 2 (314) can include a general-purpose actual printer driver capable of performing processing for printing the web page on sheets based on input intermediate data. The printer 104 may be previously determined, or may be selected by the user to perform printing. Here, the printer driver 2 (314) also functions as a printer driver for the printer 104.

A print preview unit 312 generates print preview image data based on the edited intermediate data file 315, which has already been subjected to the layout editing by the intermediate data editing unit 311, and displays the generated print preview image data on the display device 206 (FIG. 5). When the user performs a re-editing operation after the print preview unit 312 performs a print preview, the edited intermediate data file 315 is edited again to rewrite the content thereof.

A print processing unit 313 performs various types of printing control for actual printing. When the user operates the print button 404 or the print button 503, the print processing unit 313 performs print processing of the edited intermediate data file 315 (print job processing), which is a result of the editing performed by the intermediate data editing unit 311. The print job processing may be performed while changing a layout according to the arrangement information stored in the intermediate data editing unit 311, using the intermediate data file 310, instead of using the edited intermediate data file 315. The print processing unit 313 performs rendering processing for the edited intermediate data file 315 with the layout edited according to the print setting acquired from the printer driver 2 (314), and outputs rendering data on the printer driver 2 (314) via the OS 308. The printer driver 2 (314) receives the rendering data from the print processing unit 313, generates print data having a format, which can be read by the printer 104, based on the rendering data, and outputs the print data on the printer 104.

The OS 308 can include a general-purpose OS. The OS 308 provides an application programming interface (API) for exchanging a print setting data between the structured document printing module 302 and the printer driver. The OS 308 also provides an API for an exchange of the rendering processing via the printer driver. The OS 308 includes various types of control software such as a spooler system that manages a print job and a port monitor that outputs a print command on a port.

Figure 4:
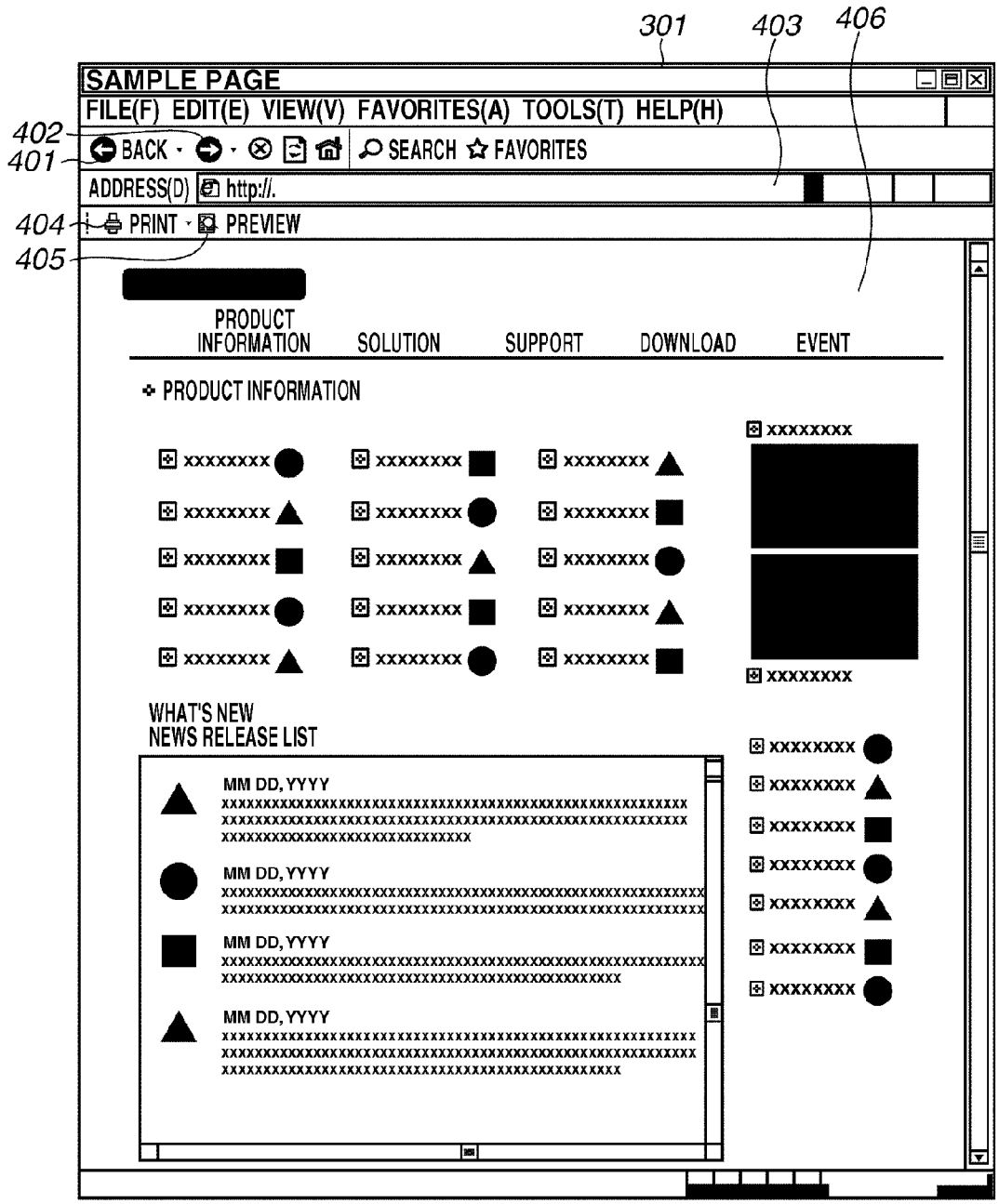
FIG. 4 illustrates an example of a screen of a browser of the PC.

FIG. 4 illustrates an example of a GUI screen appearing when the structured document printing module 302 is started on the browser 301 displayed by the display device 206 of the PC 101 and the acquired web page is displayed.

As illustrated in FIG. 4, the browser 301 provides a back button 401, a forward button 402, and an address entry field 403. The print button 404 and the print preview button 405 are provided by the UI unit 304 in the structured document printing module 302, and are displayed when the structured document printing module 302 is started. When the print button 404 is pressed, the printer driver 2 (314) processes the data which has been processed by the structured document printing module 302, without performing a print preview, and the printer 104 prints an image based on the data. When the print preview button 405 is pressed, a print preview using the print preview unit 312 is performed. A web page 406 displays the web page which has been acquired and read by the browser 301, as a visible image.

The back button 401 is a button for switching the currently displayed web page 406 to a web page having been displayed before the web page 406 is displayed. The forward button 402 is a button for switching the web page after the switching by the return button 401 in the web page 406. The address entry field 403 is a field to input a URL of a web page desired to be acquired, and displays a URL of the web page 406 currently displayed. The browser 301 also has a print menu, and issues a print instruction using the print menu of the browser 301 when the web page is printed without performing processing using the structured document printing module 302.

FIG. 5 illustrates an example of a GUI screen displayed by the structured document printing module 302, which is displayed on the display device 206 of the PC 101. The screen illustrated in FIG. 5 is displayed when the print preview button 405 is pressed on the screen illustrated in FIG. 4. The screen illustrated in FIG. 5 is displayed in another window separate from the window on the screen illustrated in FIG. 4.

In FIG. 5, a print preview screen 501 is a screen (window) displayed by the structured document printing module 302. A print preview 502 is an image based on edited print preview image data, which has been generated by the print preview unit 312 based on the web page 406 displayed on the screen illustrated in FIG. 4. A print button 503 is a button for starting printing based on a content of the print preview 502. A button for calling a screen for changing a print setting is included beside the print button 503. Thus, print appearances such as a recording medium size, a direction, and a column setting can be changed using the called screen. A printing magnification designation unit 504 is a slider for setting an enlargement/reduction rate to be used for enlarging and reducing a web page to be printed at the time of printing. The designation unit 504 changes the enlargement/reduction rate so that the print preview 502 is zoomed (a sheet image is not changed), and can confirm how printing is performed on a sheet. A button 505 is a button for automatically determining a reduction rate of a web page to be printed so that the web page closely fits the sheet when the web page sticks out of the sheet. A page switching button 506 is a button for switching the currently displayed print preview 502 to the previous page or the subsequent page. Here, the page indicates a page in a sheet unit. A display zooming button 507 is a button for changing a display magnification of the print preview 502, to be used for displaying the entire sheet or displaying the sheet based on the sheet width. Zooming by the display zooming button 507 does not affect the enlargement/reduction rate for printing. When the web page to be printed includes a plurality of pages, and a "thumbnail display" is selected by the display zooming button 507, the web page including the plurality of pages can be listed.

The flow of processing performed by the structured document printing module 302 in the above-mentioned configuration will be described below. FIG. 6 is a flowchart illustrating processing performed until the structured document printing module 302 generates the edited intermediate data file 315. The flowchart illustrates the flow of processing performed when the CPU 201 reads out a program corresponding to the structured document printing module 302 from the hard disk 204, loads the read program into the RAM 202, and executes the loaded program. Details of processing in each step are described above with reference to FIG. 3.

In step S601, the CPU 201 starts the flow when the user presses the print button 404 or the print preview button 405 on the screen illustrated in FIG. 4. In step S602, the CPU 201 acquires the width and the height (in pixel units) of the web page 406 to be processed, from the size information acquisition unit 305. The width and the height to be acquired at this time do not depend on the current window size of the browser 301 but the entire area to be displayed. More specifically, the width and the height also includes an area that can be displayed by being scrolled, though concealed and not displayed at some point of time. In some browsers, however, the width of the web page 406 may depend on the current window size. Therefore, the size information acquisition unit 305 may acquire the size information after the window width of the browser 301 is changed. The window width is enlarged when the width of the web page is smaller than a predetermined size or when the structured document of the acquired web page is to be changed as a result of being analyzed.

In step S603, the CPU 201 causes the intermediate data generation unit 307 to set a printer driver 1 (309) serving as a virtual printer driver as the output destination printer (printer driver) of the web page 406 from the browser 301.

In step S604, the CPU 201 causes the print setting unit 306 to select a user-defined recording medium size from a recording medium size type included in a print setting for the printer driver 1 (309) that can be specified from the browser 301 and set a width and a height previously acquired as a recording medium size (the number of pages is set to be one). At this time, the width or the height may be too large to fall within one page depending on the size of the acquired web page 406. In the case, the recording medium size of the web page is determined so that the web page is split with a predetermined size into a plurality of pages. When the size of the web page can fall within one recording medium size, the number of pages need not necessarily be one. The number of pages may be two or more. When the number of pages is two or more, the web page is desirably split after a page break position is controlled not to affect editing. A condition under which the number of pages is two or more includes a case where the size of the web page to be processed is equal to or larger than a predetermined size. When the size (pixels) of the web page to be processed exceeds an upper limit settable as a user-defined recording medium size, for example, the web page is split at a position that does not exceed the upper limit. Another condition under which the number of pages is two or more includes a case where the number of pages is previously determined to be two or more irrespective of the size of the web page.

In step S605, the CPU 201 sets a print setting of a header and a footer included in the print setting of the browser 301 to OFF. The print setting of the header and the footer is a setting for printing a title, a URL, a date, and a page number of the web page as a header and a footer of each of the pages when the web page is printed. If the header and the footer are added, in the output on the printer driver 1 (309), an appearance differs from that when displayed by the browser 301. Therefore, the print setting is set to OFF here. However, this setting may be omitted when the header and the footer can be deleted or when the header and the footer are desired to be added in the following editing processing.

In step S606, the CPU 201 causes the intermediate data generation unit 307 to set a margin setting included in the print setting of the browser 301 to zero. While margins are added to upper, lower, left, and right sides of each of the pages when printing is performed, the margin setting is set to zero here, so that an appearance seems closer to that when displayed by the browser 301. This setting may be omitted when the margins can be deleted or when the margins may be added in the following editing processing.

In step S607, the CPU 201 causes the intermediate data generation unit 307 to issue a print instruction to the browser 301, and correspondingly causes the browser 301 to perform processing of a print job of the web page for the printer driver 1 (309) via the OS 308 according to the print setting.

In step S608, the CPU 201 causes the intermediate data generation unit 307 to acquire a status of the print job of the web page to be processed, from the OS (spooler) 308. In step S609, the CPU 201 monitors the spooler 308 until it is determined that the print job is completed.

If it is determined that the processing of the print job is completed (YES in step S609), the processing proceeds to step S610. In step S610, the CPU 201 starts the intermediate data editing unit 311 to edit the intermediate data file 310 that has been generated by the processing of the print job. In step S611, the CPU 201 ends the processing of the intermediate data generation unit 307.

FIG. 7 illustrates the flow of processing performed until the browser 301 acquires the web page (structured document 303), the intermediate data generation unit 307 causes the printer driver 1 (309) to generate the intermediate data file 310, and, then, the intermediate data editing unit 311 generates the edited intermediate data file 315.

In FIG. 7, the web page (structured document 303), which has been acquired by the browser 301, has a width of W pixels and a height of H pixels. The intermediate data file 310, which is generated from the structured document 303 by the printer driver 1 (309) instructed by the intermediate data generation unit 307 as described above, becomes print data for one page having a width of W pixels and a height of H pixels. The width of W pixels and the height of H pixels are settable by selecting a user-defined recording medium, as described above, and by specifying the width of W pixels and the height of H pixels.

If the size of the structured document 303 exceeds an upper-limit value of a size that can be specified as the user-defined recording medium size, for example, the number of pages is forced to be two or more. In such a case, when the number of pages is n, and the height for one page is H/n, an extra margin can be prevented from occurring at a rear end of the final page. However, the structured document 303 may be divided in other dividing methods. The other dividing methods include a method for setting the size of the first page to the upper-limit size or a size smaller than the upper-limit size just a little and dividing the remaining portion into a unit of the same size. In this case, a large margin area may occur in the final page. The size of the final page may be set not to exceed a position where the original web page existed so that the margin area does not occur. The other dividing methods also include a method for specifying a division position so that the height for one page is H/n, as described above, and shifting the division position forward or backward if a specific object exists at the division position. In this case, the page size may vary among pages.

The intermediate data editing unit 311 performs layout editing for the intermediate data file 310 to perform actual printing using the printer 104. The intermediate data file 310 is output as the edited intermediate data file 315. Variable magnification processing and pagination processing corresponding to a recording medium size, a resolution, and a printable area included in the print setting acquired from the printer driver 2 (314) are performed. A layout change and a size change of each of the objects included in the intermediate data file 310 are also performed so that the web page appropriately falls within the sheet (so that the object is neither cracked nor split). The layout change and the size change of each of the objects may be automatically performed by analyzing the object, or may be performed according to an instruction from the user. An arrangement pattern of each of the objects may be determined according to an instruction from the user, and a position and a size of each of the objects may be automatically determined according to the arrangement pattern.

Here, each of pages in the edited intermediate data file 315 is edited to have a width W' and a height H'. When a recording medium size used at the time of printing is set to an International Organization Standardization (ISO) A4 size on the printer driver 2 (314), for example, the width W' is 210 mm, and the height H' is 297 mm. If the size of the original structured document 303 corresponds to one sheet or less at the time of final printing, the edited intermediate data file 315 is not divided into a plurality of pages.

Thus, the size of the intermediate data file 310 is made sufficiently larger than a recording medium size used for actual printing (a size in which a plurality of pages eventually corresponds to one page). Therefore, the intermediate data editing unit 311 can perform editing in a succeeding stage, with a margin not occurring between pages or the object not moved, so that the flexibility for the editing is increased.

Figure 8B:
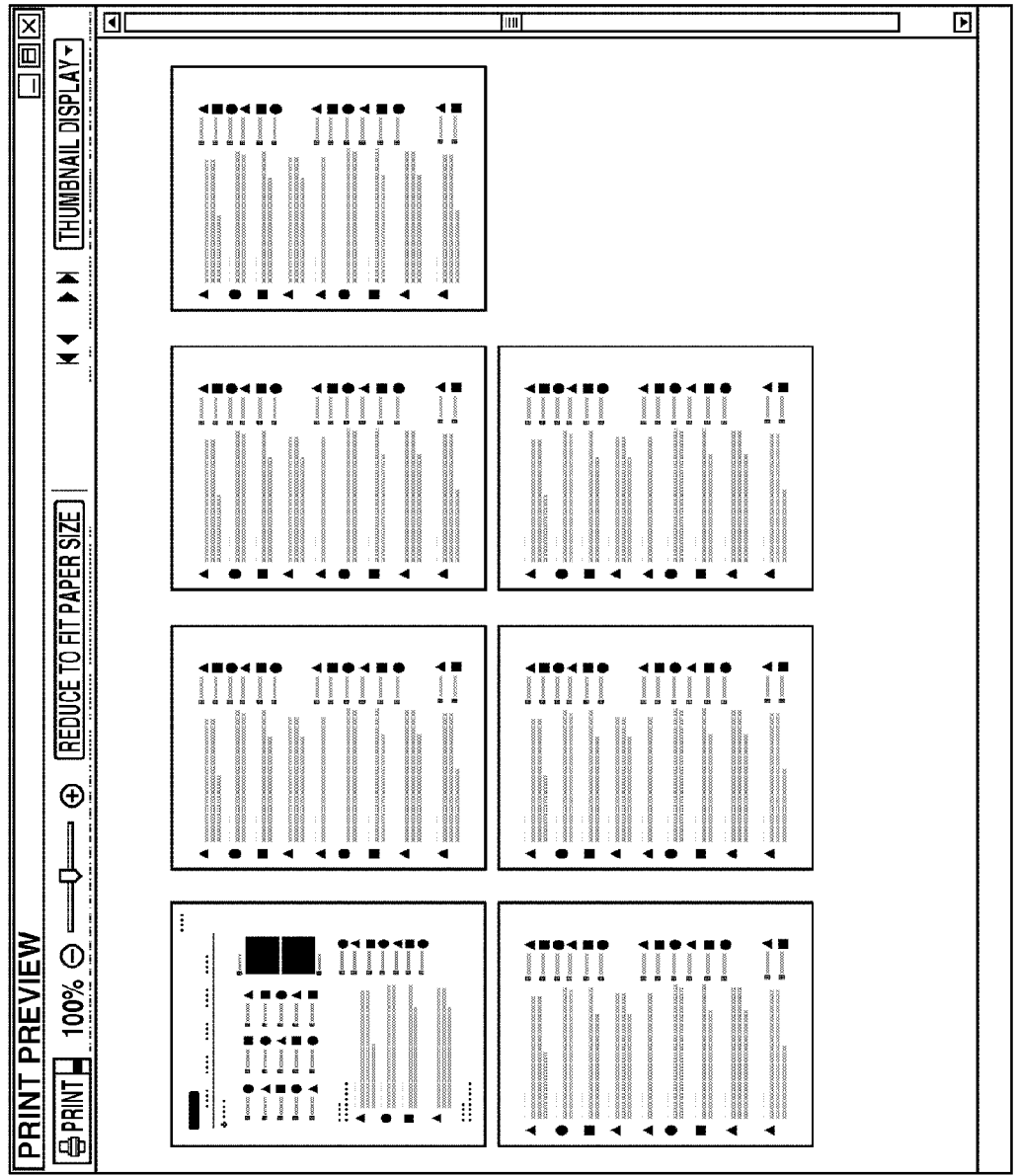

FIGS. 8A, 8B, 8C, 8D, and 8E illustrate a screen list of a web page with a plurality of pages displayed when the "thumbnail display" is selected on the display zooming button 507 in the print preview illustrated in FIG. 5. When the "thumbnail display" is selected, the print preview 502, which has been displayed in a page unit in FIG. 5, is displayed with a plurality of pages, as illustrated in FIG. 8A. While the entire structured document 303 is displayed on one screen in FIG. 8A, however, the structured document 303 including a large number of pages may be displayed with screens sequentially switched.

Figure 8C:
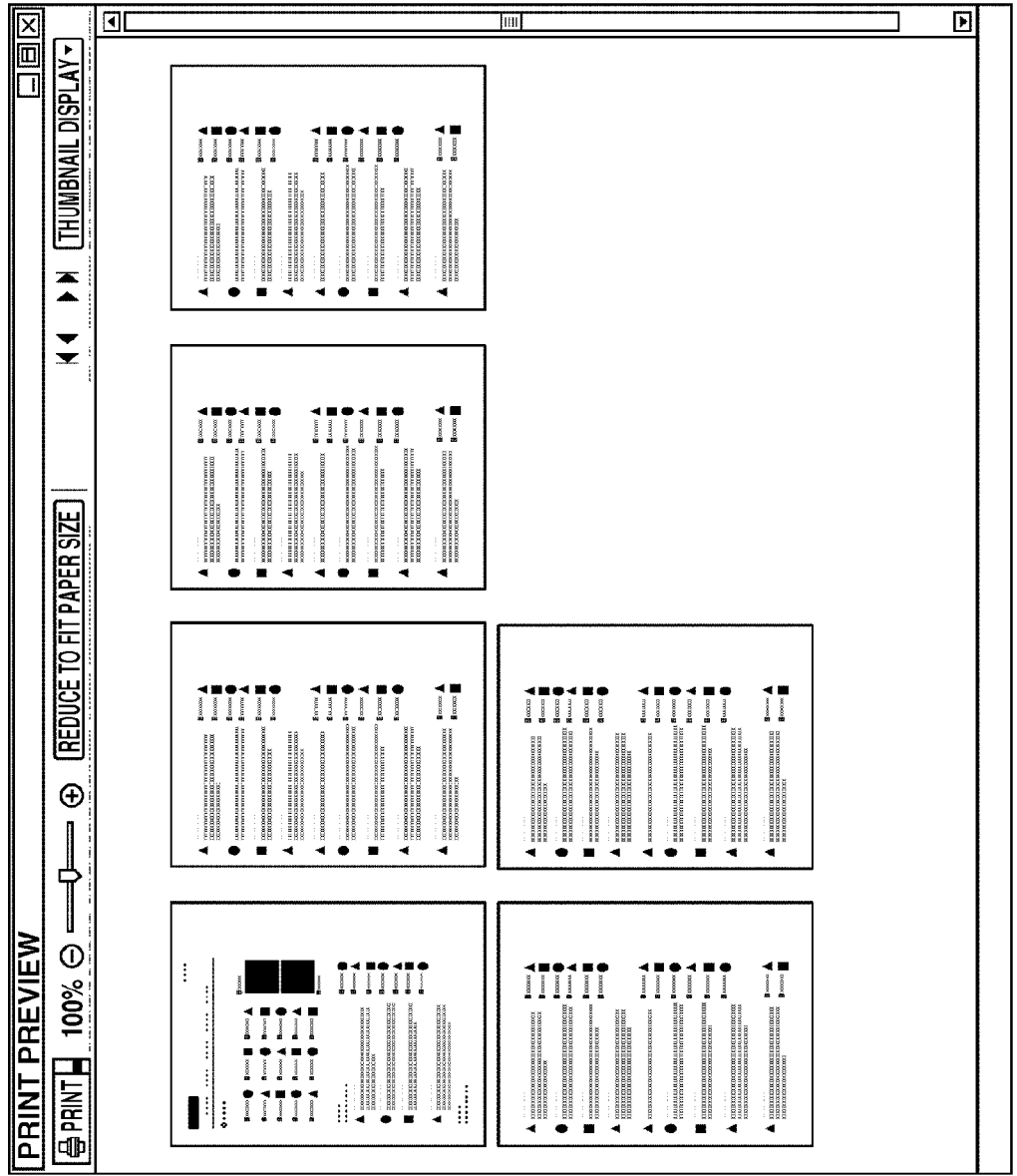
Figure 8D:
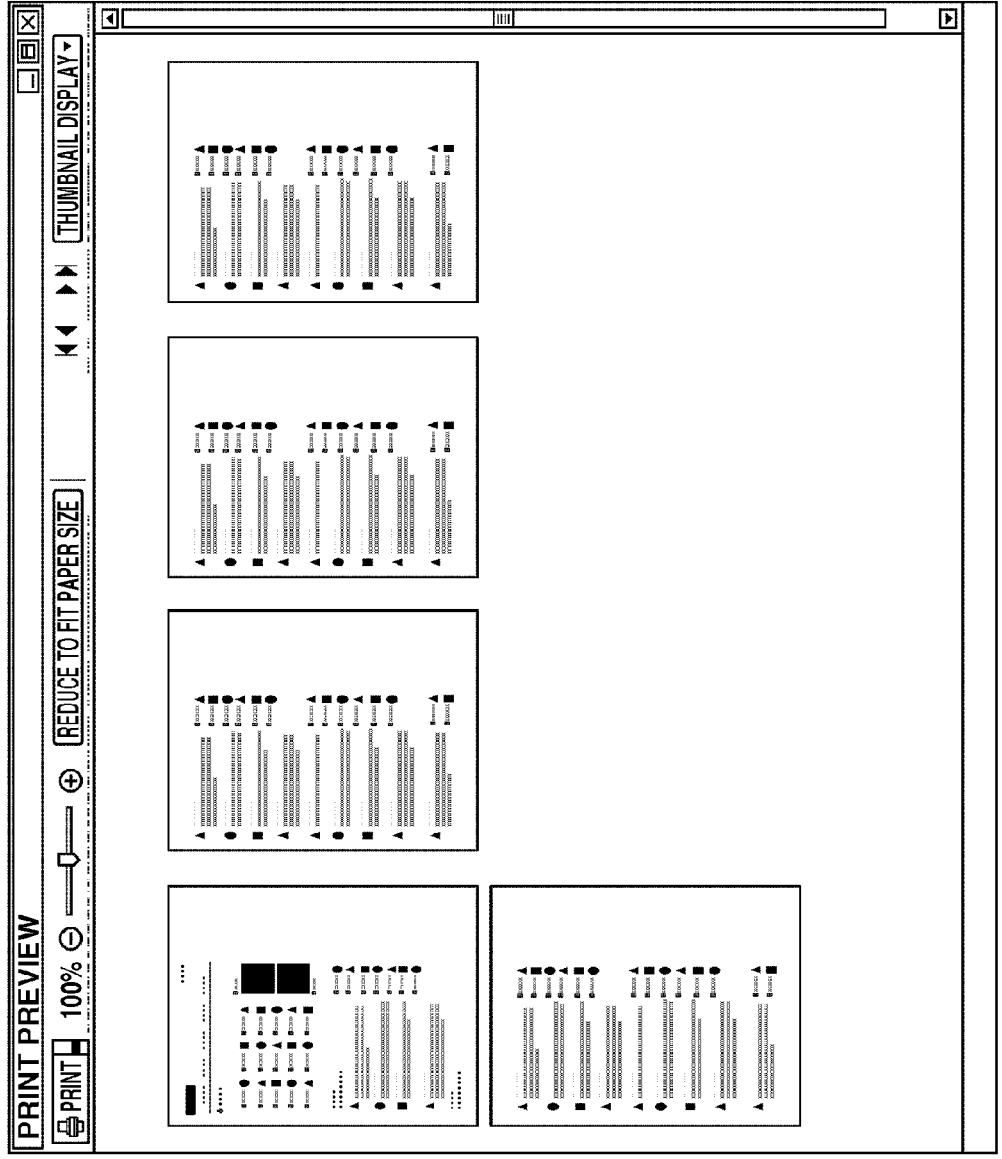

FIG. 8A illustrates an example of a print preview of the edited intermediate data file 315, which is divided into eight pages, as a result of editing the intermediate data file 310 by the intermediate data editing unit 311. An object (a character area and an image) existing across the pages is moved to the subsequent page and arranged not to be split at the time of the editing. When the user instructs the printing magnification designation unit 504 to reduce the size in this state, the print preview is changed to a print preview that is divided into seven pages, for example, as illustrated in FIG. 8B. At this time, an object existing across the pages differs from that illustrated in FIG. 8A. Therefore, processing for moving the object existing across the pages to the subsequent page based on the original intermediate data file 310 is performed. When an instruction to further reduce the size is issued, the print preview is changed to a print preview, which is divided into six pages, for example, as illustrated in FIG. 8C. At this time, editing processing is performed according to the original intermediate data file 310, as described above. FIG. 8D illustrates an example of a print preview, which is divided into five pages, by an instruction to further reduce the size.

FIG. 8E illustrates an example of a print preview when a sheet direction and a column setting are changed from a print setting. The sheet direction in the print setting is changed from a portrait to a landscape from the print preview illustrated in FIG. 8D, and the column setting is changed to a double column layout, so that the five divided pages are placed for two pages each in a sheet placed in landscape orientation. As a result, a print preview for three pages is displayed, as illustrated in FIG. 8E.

The examples of changing a magnification using the printing magnification designation unit 504 or changing a print setting have been described. However, the intermediate data editing unit 311 can also perform some other editing. For example, the user can trim a predetermined area in a print preview by operating the input device 207 (e.g., a pointing device) or can enlarge, reduce, and move any object.

As described above, if the acquired structured document 303 includes data having a vector format, the editing processing in the succeeding stage can be performed still in the vector format by generating the intermediate data file 310 using the virtual printer driver based on the structured document 303. Therefore, a high-quality image can be obtained in the editing in the succeeding stage. When the intermediate data is generated using the virtual printer driver, a recording medium size is set according to the size of the structured document 303. Thus, the editing in the succeeding stage can be performed without the data being divided, in a format similar to the format that the data is displayed by the browser 301, so that the flexibility for the editing is increased.

While the printer driver 1 serving as a virtual printer driver and the printer driver 2 serving as an actual printer driver are used in the present exemplary embodiment, the two printer drivers may be combined into one printer driver. In this case, when the intermediate data file 310 is generated, the recording medium size is set to match the size of the structured document 303 while remaining stored in the spooler 308 without being output on the printer 104. When the intermediate data file 310 has been generated, the processing proceeds to processing in the intermediate data editing unit 311. The intermediate data editing unit 311 changes the recording medium size to a recording medium size originally set for actual printing. When the intermediate data editing unit 311 completes the editing, the print processing unit 313 performs processing, and outputs a processing result on the printer 104.

In the above-mentioned exemplary embodiment, the recording medium size is set to match the size of the structured document 303 in generating the intermediate data on the virtual printer driver so that the data is not divided into pages. If the virtual printer driver has an enlargement/reduction function, however, the recording medium size may be reduced using this function. Further, using both the recording medium size setting and the size reduction processing may prevent the data from being divided into pages. Instead of a user-defined recording medium size, a definite size in which the number of pages is one may be selected as a recording medium size at the time of print job processing of the virtual printer driver.

While the web page is eventually printed in the above-mentioned exemplary embodiment, the present invention is not limited to this. The edited intermediate data file 315, which has been edited by the intermediate data editing unit 311, may be stored in a predetermined storage device or may be sent to an external apparatus.

While the data to be processed is the web page acquired by the browser 301 in the above-mentioned exemplary embodiment, data in another format, which is not divided in a page unit, may be the data to be processed.

Aspects of the present invention can also be realized by a computer or a plurality of computers of a system or apparatus (or devices such as a CPU or MPU) that reads out and executes a program recorded on a memory device to perform the functions of the above-described embodiment (s), and by a method, the steps of which are performed by a computer or a plurality of computers of a system or apparatus by, for example, reading out and executing a program recorded on a memory device to perform the functions of the above-described embodiment(s). For this purpose, the program is provided to the computer or the computers for example via a network or from a recording medium of various types serving as the memory device (e.g., computer-readable medium).

Moreover, it is not necessary to realize all the processes described above by the software, and part of or all the processes may be realized by hardware like an ASIC.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-194963 filed Sep. 7, 2011, which is hereby incorporated by reference herein in its entirety.

What is claimed is:

1. An apparatus comprising:
an input unit configured to input information for specifying a width and a height of data to be processed;
a setting unit configured to set a first printer driver as an output destination printer driver of the data in accordance with a predetermined print instruction from a user, irrespective of a printing apparatus which has been set as an output destination printer;
a first processing unit configured to cause, in accordance with the predetermined print instruction, the first printer driver set by the setting unit to generate intermediate data of the data so that the intermediate data is not divided into pages, by setting a recording medium size based on the width and height of the data specified by the information input by the input unit;
a second processing unit configured to perform editing processing to the intermediate data generated by the first printer driver based on the first processing unit; and
a print control unit configured to cause a printing apparatus to print an image based on the intermediate data to which the editing processing is performed by the second processing unit, by using a second printer driver different from the first printer driver.

2. The apparatus according to claim 1, wherein the first processing unit causes the first printer driver to generate the intermediate data by setting the width and the height to the first printer driver as the recording medium size.

3. The apparatus according to claim 1, wherein the first processing unit generates the intermediate data using the first printer driver by setting a recording medium size in which the number of pages of the generated intermediate data is to be one.

4. The apparatus according to claim 1, wherein the intermediate data generated by the first printer driver includes a vector format data when the data to be processed has the vector format data.

5. The apparatus according to claim 1, further comprising:
a preview unit configured to preview a result edited by the second processing unit,
wherein the second processing unit can perform editing again based on an instruction from a user with respect to the preview by the preview unit.

6. The apparatus according to claim 5, wherein the setting unit further sets the first printer driver and the first processing unit causes the first printer driver to generate the intermediate data, in accordance with a preview instruction by a user, and wherein the preview unit previews the result edited by the second processing unit in accordance with the preview instruction.

7. The apparatus according to claim 1,
wherein the second processing unit performs the editing processing according to a print setting on the second printer driver.

8. The apparatus according to claim 1, wherein the data to be processed is a structured document.

9. The apparatus according to claim 8, wherein the data to be processed corresponds to a structured document of a web page which can be displayed by a web browser.

10. The apparatus according to claim 9, wherein the first processing unit causes the first printer driver to generate the intermediate data via the web browser, in accordance with the predetermined print instruction.

11. The apparatus according to claim 10, wherein the web browser causes the first printer driver to generate the intermediate data, by outputting the data to be processed to the first printer driver in accordance with the predetermined print instruction.

12. The apparatus according to claim 11, wherein the web browser outputs the data to the first printer driver for generating the intermediate data in a similar manner as outputting, of the data to the second printer driver, performed by the web browser in a case where the web browser cause the printing apparatus to print the data by using the second printer driver.

13. The apparatus according to claim 9, wherein the setting unit sets the first printer driver, in accordance with the predetermined print instruction from a user to display item displayed in a window by the web browser.

14. The apparatus according to claim 1, wherein the first processing unit causes the first printer driver to generate intermediate data, by further setting a header setting and a footer setting so that a header and a footer are not added to the data.

15. The apparatus according to claim 1, wherein the first processing unit causes the first printer driver to generate intermediate data, by further setting a margin setting so that a margin is not added to the data.

16. The apparatus according to claim 1, wherein the data to be processed is a structured document which corresponds to a web page and is displayed by a web browser, and wherein at least one processor functions as the input unit, the setting unit, the first processing unit, the second processing unit, and the print control unit by executing a plug-in program for the web browser.

17. The apparatus according to claim 16, wherein the plug-in program does not include the first printer driver or the second printer driver.

18. The apparatus according to claim 1, wherein the second printer driver corresponds to a printer selected by the user.

19. The apparatus according to claim 1, wherein the second processing unit performs the editing process in accordance with a print setting set in the second printer driver.

20. The apparatus according to claim 19, wherein the second processing unit performs magnification processing or pagination processing to the intermediate data in accordance with a recording medium size set in the print setting set in the second printer driver.

21. A method comprising:
inputting information for specifying a width and a height of data to be processed;
setting a first printer driver as an output destination printer driver of the data, in accordance with a predetermined print instruction from a user, irrespective of a printing apparatus which has been set as an output destination printer;
causing, in accordance with the predetermined print instruction, the first printer driver to generate intermediate data of the data so that the intermediate data is not divided into pages, by setting a recording medium size based on the width and a height of the data specified by the input information;

performing editing processing to the intermediate data generated by the first printer driver; and causing a printing apparatus to print an image based on the intermediate data to which the editing processing is performed, by using a second printer driver different from the first printer driver.

22. The method according to claim 21, wherein the intermediate data is generated using the first printer driver by setting the width and the height to the first printer driver as the recording medium size.

23. The method according to claim 21, wherein the intermediate data is generated using the first printer driver by setting a recording medium size in which the number pages of the generated intermediate data is to be one.

24. The method according to claim 21, wherein the intermediate data is generated by the first printer driver includes a vector format data in a case where the data to be processed has the vector format data.

25. The method according to claim 21, further comprising:
causing a display to preview a result edited by the editing processing; and
performing editing again based on an instruction from a user with respect to the previewed result.

26. The method according to claim 21, further comprising:
wherein the editing processing is performed according to a print setting on the second printer driver.

27. The method according to claim 21, wherein the data to be processed is a structured document.

28. The method according to claim 21, wherein the data to be processed is a structured document which corresponds to a web page and is displayed by a web browser, and the method is executed by a plug-in program for the web browser.

29. The method according to claim 28, wherein the plug-in program does not include the first printer driver or the second printer driver.

30. A non-transitory computer-readable storage medium storing a computer-executable program causing a computer or computers to execute a method, the method comprising:
inputting information for specifying a width and a height of data to be processed;
setting a first printer driver as an output destination printer driver of the data, in accordance with a predetermined print instruction from a user, irrespective of a printing apparatus which has been set as an output destination printer;
causing, in accordance with the predetermined print instruction, the first printer driver to generate intermediate data of the data so that the intermediate data is not divided into pages, by setting a recording medium size based on the width and a height of the data specified by the input information;
performing editing processing to the intermediate data generated by the first printer driver; and
causing a printing apparatus to print an image based on the intermediate data to which the editing processing is performed, by using a second printer driver different from the first printer driver.

31. The medium according to claim 30, wherein the computer-executable program is a plug-in program for a web browser, and the data to be processed is a structured document which corresponds to a web page and is displayed by the web browser.

32. The medium according to claim 31, wherein the plug-in program does not include the first printer driver or the second printer driver.

* * * * *